United States Patent
Chen et al.

(10) Patent No.: US 11,525,522 B2
(45) Date of Patent: Dec. 13, 2022

(54) SELF-RETAINING, MAGNETICALLY-COUPLED AND DIRECTLY-OPERATED FOUR-WAY REVERSING VALVE

(71) Applicant: ZHUJI YIBA ELECTRONIC VALVE CO., LTD., Zhejiang (CN)

(72) Inventors: Huajun Chen, Zhejiang (CN); Yulong Chen, Zhejiang (CN); Xiaoshui He, Zhejiang (CN)

(73) Assignee: ZHUJI YIBA ELECTRONIC VALVE CO., LTD., Zhejiang (CN)

( * ) Notice: Subject to any disclaimer, the term of this patent is extended or adjusted under 35 U.S.C. 154(b) by 134 days.

(21) Appl. No.: 17/252,305

(22) PCT Filed: Nov. 25, 2019

(86) PCT No.: PCT/CN2019/120522
§ 371 (c)(1),
(2) Date: Dec. 15, 2020

(87) PCT Pub. No.: WO2020/253097
PCT Pub. Date: Dec. 24, 2020

(65) Prior Publication Data
US 2021/0293343 A1    Sep. 23, 2021

(30) Foreign Application Priority Data

Jun. 18, 2019 (CN) .......................... 201910526410.2

(51) Int. Cl.
*F16K 31/06* (2006.01)
*F16K 11/074* (2006.01)
(Continued)

(52) U.S. Cl.
CPC ...... *F16K 31/0617* (2013.01); *F16K 11/0743* (2013.01); *F16K 31/105* (2013.01); *F16H 1/46* (2013.01); *F16H 37/041* (2013.01)

(58) Field of Classification Search
CPC .. F16K 11/0743; F16K 11/074; F16K 31/105; F16K 31/047; F16K 31/535;
(Continued)

(56) References Cited

U.S. PATENT DOCUMENTS 4,077,424 A * 3/1978 Ehret .................... F16K 11/074
                                                            137/119.07
6,125,885 A * 10/2000 Hirata .................... F25B 41/26
                                                            251/288
(Continued)

*Primary Examiner* — Mary E McManmon
*Assistant Examiner* — Andrew J Rost
(74) *Attorney, Agent, or Firm* — McClure, Qualey & Rodack, LLP

(57) ABSTRACT

Disclosed is a four-way reversing valve, including a valve body, a motor transmission structure, and a reversing valve disc; the valve body includes a valve seat, an insulation sleeve welded to upper end surface of the valve seat, a D pipe, an S pipe, a C pipe, and an E pipe connected to lower end surface of the valve seat; the motor transmission structure includes motor worm gear and shaft transmission assembly and a planetary gearbox kit; the motor worm gear and shaft transmission assembly is sleeved onto upper external wall of the insulation sleeve through shaft hole of an external drive sprocket, and a non-through blind-hole is formed in a valve seat center; a central shaft is embedded into the blind-hole, and the central shaft connects the reversing valve disc and the planetary gearbox kit; the reversing valve disc and the planetary gearbox kit are inside the insulation sleeve.

11 Claims, 10 Drawing Sheets

(51) Int. Cl.
  *F16K 31/10* (2006.01)
  *F16H 1/46* (2006.01)
  *F16H 37/04* (2006.01)

(58) Field of Classification Search
  CPC .......... F16K 31/06; F16K 31/04; F16K 31/08; F16H 1/46; F16H 1/16; F16H 1/28; F16H 37/041; F25B 2313/0272; F25B 2313/02731; F25B 2313/02732; F25B 2313/02741; F25B 2313/02742; F25B 2313/02743; F25B 2313/0276; F25B 2313/0279; F25B 2313/02791; F25B 2313/02792
  See application file for complete search history.

(56) References Cited

U.S. PATENT DOCUMENTS

| | | | | |
|---|---|---|---|---|
| 2006/0230770 | A1* | 10/2006 | Kitsch | F25B 13/00 62/151 |
| 2008/0060706 | A1* | 3/2008 | Combs | F16K 37/0041 251/315.01 |
| 2013/0175463 | A1* | 7/2013 | Burgess | F16K 31/54 251/129.03 |
| 2018/0149237 | A1* | 5/2018 | Lim | F16H 3/44 |
| 2020/0215899 | A1* | 7/2020 | Boom | F16H 1/206 |

\* cited by examiner

SELF-RETAINING, MAGNETICALLY-COUPLED AND DIRECTLY-OPERATED FOUR-WAY REVERSING VALVE

TECHNICAL FIELD

The present invention relates to a self-retaining, magnetically-coupled and directly-operated four-way reversing valve.

BACKGROUND TECHNOLOGY

At present, structure of four-way reversing valves at home and abroad is of lead type solenoid control manner, that is to say, the reversing valve is controlled by a lead type solenoid valve, which is not only costly but also involves complicated processing technology. When heating in winter, this four-way reversing valve needs to be reversed, so it is necessary to energize the lead type solenoid valve, but this control method requires a long-time power supply. Therefore, this control method will not only waste electricity, but also pose potential dangers to electricity safety.

DETAILED DESCRIPTION OF THE PRESENT INVENTION

The purpose to be achieved by the present invention is to provide a self-retaining, magnetically-coupled and directly-operated four-way reversing valve, which is simple in processing technology, energy-saving, and even provides guarantee for electrical safety.

In order to achieve the above purpose, the present invention adopts the following technical solutions: a self-retaining and magnetically-coupled solenoid operated four-way reversing valve, including a valve body, a motor transmission structure, and a reversing valve disc, wherein the valve body includes a valve seat, an insulation sleeve welded onto the upper end surface of the valve seat and a D pipe, an S pipe, a C pipe, and an E pipe, which are connected to the lower end surface of the valve seat; the motor transmission structure includes a motor worm gear and shaft transmission assembly and a planetary gearbox kit; the motor worm gear and shaft transmission assembly is sleeved onto the upper part of external wall of the insulation sleeve by shaft hole of an external drive sprocket, and a non-through blind hole is formed in the center of the valve seat, a central shaft is embedded in the blind hole, and the central shaft sequentially connects the reversing valve disc and the planetary gearbox kit; the reversing valve disc and the planetary gearbox kit are mounted inside the insulation sleeve which is on the upper end of the valve seat.

Further, the reversing valve disc is provided with a first internal slot and a second internal slot opposite to the first internal slot.

Further, the lower end surface of the first internal slot is in contact with the upper end surface of the valve seat, while the second internal slot is spaced from the upper end surface of the valve seat, and two through holes are arranged on the second internal slot.

Further, the center of the reversing valve disc is provided with a first through hole matching the central shaft; first positioning shafts engaging with first planetary gear s are formed above both the first internal slot and the second internal slot.

Further, number of the first positioning shafts is two to six, and the first positioning shafts are evenly distributed on a circular track.

Further, the valve seat is provided with a D hole, an S hole, a C hole, and an E hole. The D hole is opposite to the S hole, and the C hole is opposite to the E hole.

Further, the D hole is a through hole, while the S hole, the C hole, and the E hole are step holes. And the upper end surface of the D pipe is higher than the upper end surface of the valve seat and is located in the second internal slot.

Further, a step corresponding to the insulation sleeve is formed on the outside of the valve seat.

Further, the planetary gearbox kit includes the first positioning shaft on the reversing valve disc, the first planetary gear, the planetary gear disc, the internal drive sprocket, the ring gear, the central shaft and the bearing disc; the central shaft sequentially connects the reversing valve disc, the planetary gear discs, the internal drive sprocket, and the bearing disc from bottom up together.

Further, first planetary gears are respectively mounted on first positioning shafts on the reversing valve disc and second positioning shafts on the planetary gear discs, and the number of the second positioning shafts is equal to that of the first positioning shafts.

Further, the second planetary gears on the planetary gear discs are engaged and flush with the first planetary gears respectively fitted on the first positioning shafts.

Further, the internal drive sprocket is provided with third planetary gear, which is engaged and flush with the first planetary gears provided on the respective second positioning shafts.

Further, the planetary gear disc and the first planetary gears are embedded in the ring gear.

Further, the ring gear is fixed on the internal wall of the insulation sleeve between the reversing valve disc and the internal drive sprocket; the internal teeth of the ring gear are engaged with the external teeth of the first planetary gears mounted on the first positioning shafts and the second positioning shafts.

Further, the center of the planetary gear disc forms a second through hole penetrating up and down and matching with the central shaft; a gear disc is formed on the second planetary gears, the shape thereof is a regular triangle, or a square or a circle; the gear disc has a larger diameter than the second planetary gears, and is smaller than that of internal hole of the ring gear; the second positioning shafts are disposed on upper end surface of the gear disc, and the second positioning shafts are evenly distributed on the gear disc along a circular track. The planetary gearbox kit may comprise one or more planetary gear discs, located between the reversing valve disc and the internal drive sprocket.

Further, center of the internal drive sprocket forms a third through hole fully penetrating and matching the central shaft, a second drive sprocket is formed on an upper end surface of a third planetary gear, and external diameter of the second drive sprocket is larger than that of the third planetary gear, and is larger than or equal to external diameter of the ring gear; the second drive sprocket is provided with several second clamping slots matching the second magnetic steel, the second clamping slots are provided to be two or more, evenly distributed along the outer border of the second drive sprocket; a bearing disc is provided on the second drive sprocket, and a through hole is formed in center of the bearing disc and penetrates up and down and matches the central shaft. The external wall of the bearing disc is fixed on the internal wall of the insulation sleeve, or there is a slight gap between the bearing disc and the insulation sleeve, and the gap may be between 0.2 mm and 1.5 mm. And purpose of the bearing disc is to prevent the central shaft from swaying during transmission of the planetary gearbox kit.

Further, each first planetary gear is provided with a through hole matching each of the first positioning shaft and the second positioning shaft, and external teeth of the first planetary gears engage with the ring gear, the second planetary gears and the third planetary gear.

Further, the motor worm gear and shaft transmission assembly includes a waterproof motor, a worm shaft and an external drive sprocket; the external drive sprocket comprises first clamping slots matching first magnetic steel provided inside the external drive sprocket, and a worm gear matching the worm shaft located outside.

Further, number of the first clamping slots is equal to that of the second clamping slots, and both are evenly distributed; the external drive sprocket is at the same height as the second drive sprocket, and is located outside the insulation sleeve while the internal drive sprocket within the insulation sleeve; the waterproof motor is fixed on the motor bracket through two screw holes on a motor bracket and corresponding screws; the motor bracket is provided with a motor shaft sleeve hole and a worm shaft positioning sleeve hole, the motor shaft sleeve hole and the screw holes are on the same side of the motor bracket, while the worm shaft positioning sleeve hole is on the other side of the motor bracket, one side of the motor bracket and the other side are opposite and parallel to each other; the motor bracket is fixed to the external wall of the insulation sleeve, and the motor bracket is located under the lower end surface of the external drive sprocket; the worm shaft positioning sleeve hole engages with a circle formed by the second step of the worm shaft positioning sleeve; a protective cover is fixed to the upper part of the insulation sleeve by a sleeve opening provided on a worm gear protective cover, the external drive sprocket is provided within the worm gear protective cover of the protective cover, the lower end surface of the worm gear protective cover may flush with the lower end surface of the external drive sprocket, or slightly higher than it, the upper end surface of the external drive sprocket is spaced from the upper internal wall of the worm gear protective cover, and the outside of the external drive sprocket is separated from the circular internal wall of the worm gear protective cover.

Further, a thread rod matching the worm gear is formed outside the worm shaft, and a small hole matching the output shaft of the waterproof motor is formed in one end of the worm shaft; the other end of the worm shaft is provided with a worm shaft positioning sleeve; a through hole is provided inside the worm shaft positioning sleeve, and a first step and a second step are formed on the outside thereof.

Further, a worm shaft opening is provided on a side of the worm gear protective cover, and the length of the worm shaft opening corresponds to that of the thread rod, the protective cover further includes a worm shaft protective cover, which is connected to one side of the worm gear protective cover at the worm shaft opening, and the other side is flat with the upper end surface of the motor bracket, the worm shaft protective cover is angular or arc-shaped, and the internal wall of the worm protective cover is not in immediate contact with the thread rod.

Further, the magnetic N pole surfaces (magnetic S pole surfaces) of the first magnetic steel face the external wall of the insulation sleeve, and the magnetic N pole surfaces (magnetic S pole surfaces) of the second magnetic steel face the internal wall of the insulation sleeve, alternatively, the magnetic N pole surfaces (magnetic S pole surfaces) of the first magnetic steel face the external wall of the insulation sleeve, and the magnetic S pole surfaces (magnetic N pole surfaces) of the second magnetic steel face the internal wall of the insulation sleeve.

Compared with the prior art, the present invention has the following beneficial effects:

In the present invention, reversion of the reversing valve is done by: driving the worm shaft and worm gear with the motor, and driving the internal drive sprocket with the worm gear by magnet coupling, and driving the planetary gearbox kit with the third planetary gears provided on the internal drive sprocket. After reversing is completed, no more power supply is required. The self-retaining function of the present invention is realized through this motor transmission structure.

In the present invention, all of the external drive sprocket, internal drive sprocket, planetary gear disc, first planetary gears, worm shaft, ring gear, reversing valve disc are injection-molded, which is of good self-lubricity and a small friction coefficient, and greatly improves the service life of the product. Meanwhile, with this processing method, material cost is reduced and resources are saved.

In the present invention, the reversing valve no or only slight leakage is achieved by the soft sealing way done by the first internal slot and the upper end surface of the valve seat.

BRIEF DESCRIPTION OF THE DRAWINGS

The invention is further described with reference to the drawings.

SPECIFIC EMBODIMENT

The technical solution of the present invention will be further described in details by embodiment 1.

Figure 1:
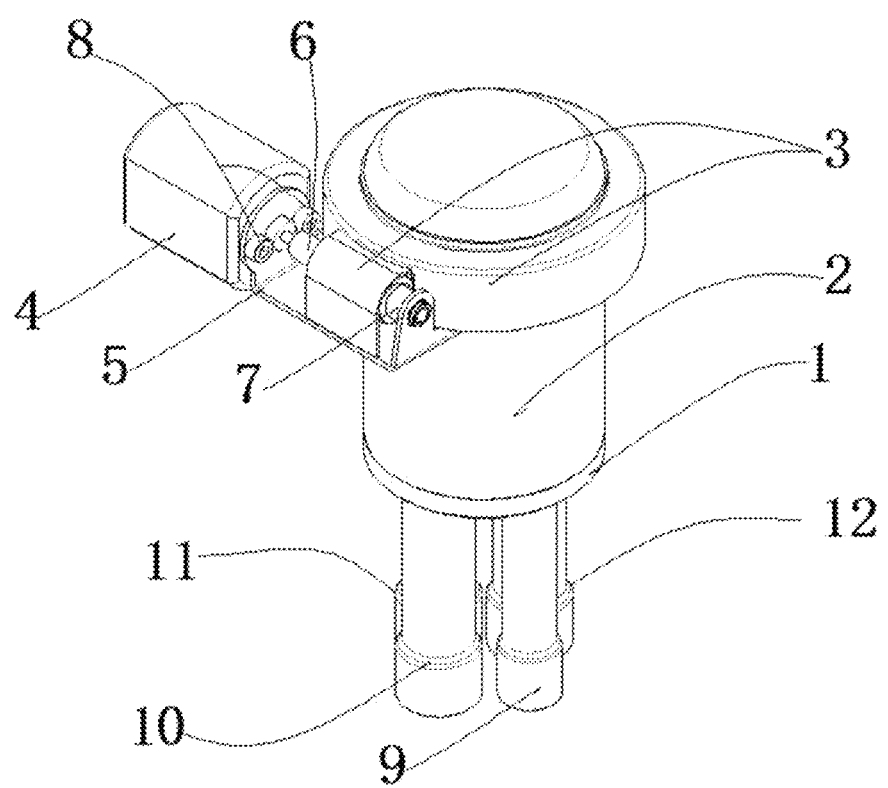
FIG. 1 is a schematic view of external structure of the present invention.

As shown in FIG. 1, 2, 3 . . . 15, a self-retaining and magnetically-coupled solenoid operated four-way reversing valve, including a valve body, a motor transmission structure, and a reversing valve disc 13, wherein the valve body includes a valve seat 1, an insulation sleeve 2 welded onto the upper end surface of the valve seat 1, and a D pipe 9, an S pipe 11, a C pipe 10, and an E pipe 12, which are connected to the lower end surface of the valve seat 1; the motor transmission structure includes a motor worm gear and shaft transmission assembly and a planetary gearbox kit; the motor worm gear and shaft transmission assembly is sleeved onto the upper part of external wall of the insulation sleeve 2 by shaft hole 2203 of an external drive sprocket 22, and a non-through blind hole 105 is formed in the center of the valve seat 1, a central shaft 14 is embedded in the blind hole 105, and the central shaft 14 sequentially connects the reversing valve disc 13 and the planetary gearbox kit; the reversing valve disc 13 and the planetary gearbox kit are mounted inside the insulation sleeve 2 which is on the upper end of the valve seat 1.

Figure 3:
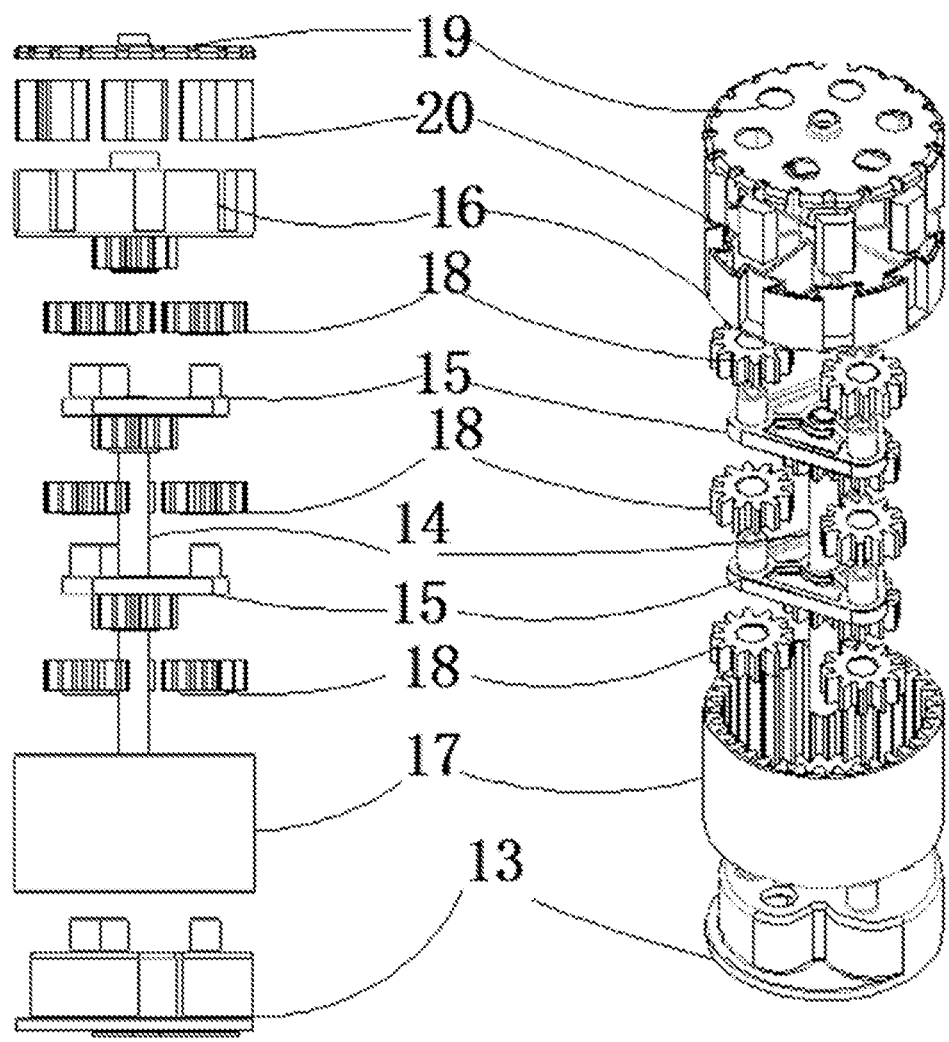
FIG. 3 is an exploded schematic view of a planetary gearbox kit in the present invention.
Figure 4:
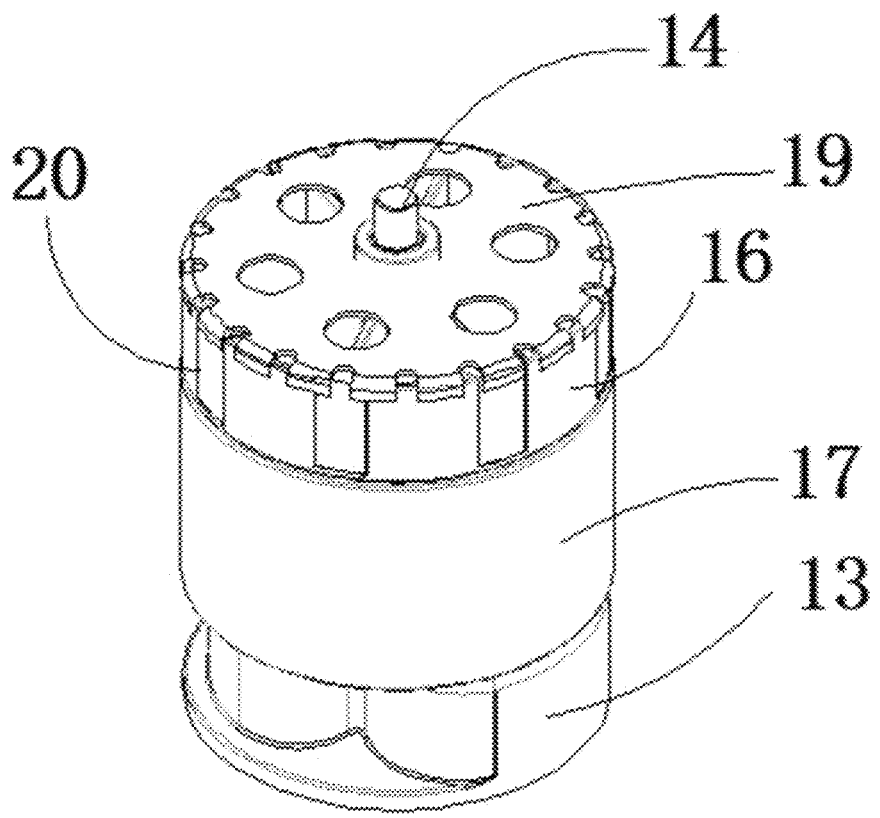
FIG. 4 is a schematic view of a planetary gearbox kit in the present invention.
Figure 6:
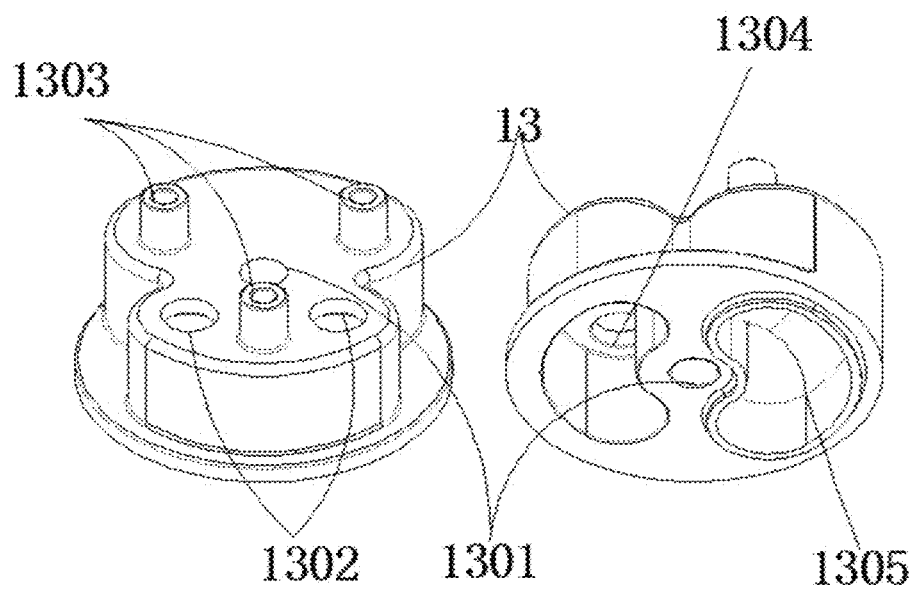
FIG. 6 is a schematic view of a reversing valve disc in the present invention.
Figure 7:
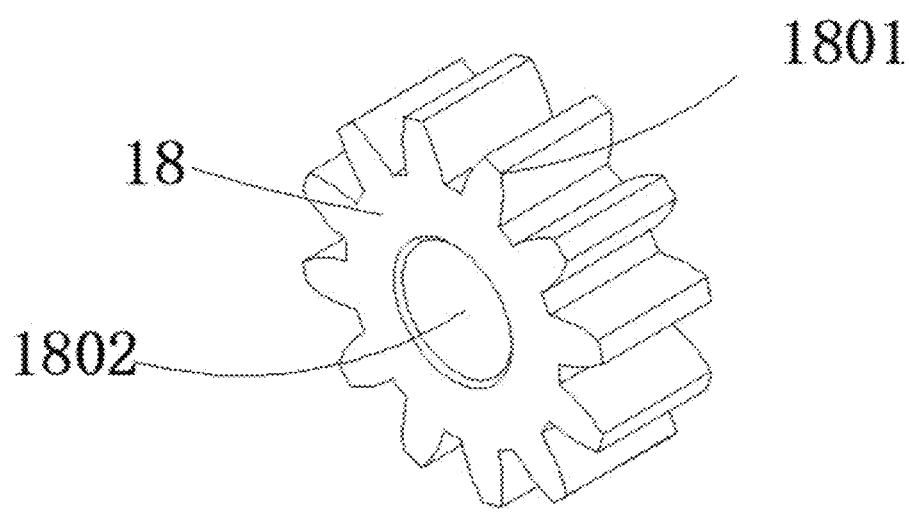
FIG. 7 is a schematic view of a first planetary gear in the present invention.

The invention is further explained with reference to FIGS. 3 and 6, the reversing valve disc 13 is provided with a first internal slot 1305 and a second internal slot 1304 opposite to the first internal slot 1305. A lower end surface of the first internal slot 1305 is in contact with the upper end surface of the valve seat 1, while the second internal slot 1304 is spaced apart from the upper end surface of the valve seat 1, and two through holes 1302 are arranged on the second internal slot 1304. The center of the reversing valve disc 13 is provided with a first through hole 1301 matching the central shaft 14; first positioning shafts 1303 engaging with first planetary gear 18s are formed above both the first internal slot 1305 and the second internal slot 1304. Number of the first positioning shafts 1303 is two to six, and the first positioning shafts 1303 are evenly distributed on a circular track.

Figure 5:
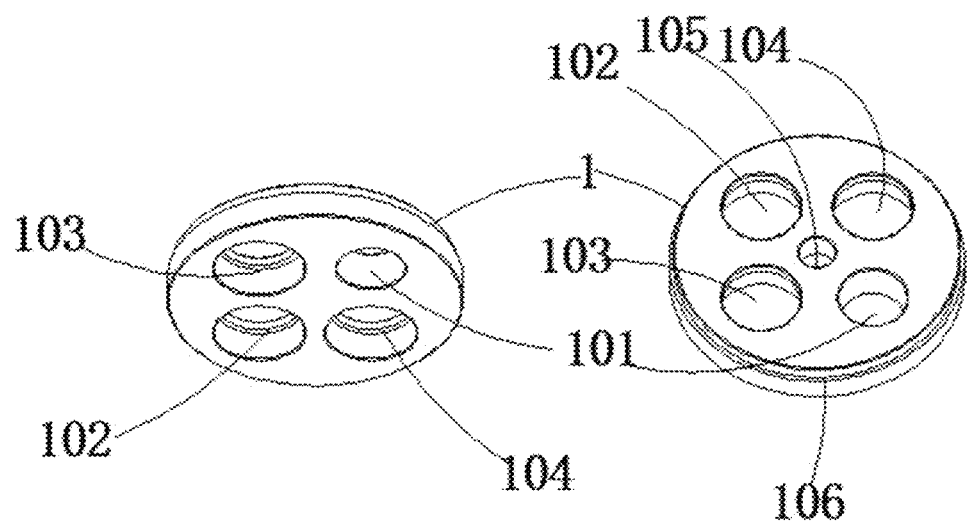
FIG. 5 is a schematic view of a valve seat in the present invention.

The invention is further explained with reference to FIG. 5, the valve seat 1 is provided with a D hole 101, an S hole 102, a C hole 103 and an E hole 104. The D hole 101 is opposite to the S hole 102, and the C hole 103 is opposite to the E hole 104. The D hole 101 is a through hole, while the S hole 102, the C hole 103, and the E hole 104 are step holes. The upper end surface of the D pipe 10 is higher than the upper end surface of the valve seat 1, and is located in the second internal slot 1304. And a step 103 corresponding to the insulation sleeve 2 is formed outside the valve seat 1.

The invention is further explained with reference to FIG. 2, FIG. 3, FIG. 4, FIG. 6 to FIG. 10 and FIG. 12, the planetary gearbox kit includes the first positioning shafts 1303 on the reversing valve disc 13, the first planetary gears 18, the planetary gear discs 15, the internal drive sprocket 16, the ring gear 17, the central shaft 14 and the bearing disc 19.

Wherein the central shaft 14 sequentially connects the reversing valve disc 13, the planetary gear discs 15, the internal drive sprocket 16, and the bearing disc 19 from the bottom up together.

Wherein, the first planetary gears 18 are respectively mounted on the first positioning shafts 1303 on the reversing valve disc 13 and second positioning shafts 1501 on the planetary gear disc 15; number of the second positioning shafts 1501 is equal to that of the first positioning shafts 1303.

Wherein, the second planetary gears 1503 on the planetary gear disc 15 is engaged and flush with the first planetary gears 18 respectively fitted on the first positioning shafts 1303.

Wherein, the internal drive sprocket 16 is provided with a third planetary gear 1601, which is engaged and flush with the first planetary gears 18 provided on the respective second positioning shafts 1501.

Wherein, the planetary gear disc 15 and the first planetary gears 18 are embedded in the ring gear 17.

Wherein, the ring gear 17 is fixed on internal wall of the insulation sleeve 2 between the reversing valve disc 13 and the internal drive sprocket 16; and the internal teeth 1701 of the ring gear 17 are engaged with the external teeth 1801 of the first planetary gears 18 mounted on the first positioning shafts 1303 and the second positioning shafts 1501.

Wherein, the planetary gearbox kit is provided with two planetary gear discs 15, which locate between the reversing valve disc and the internal drive sprocket.

Figure 8:
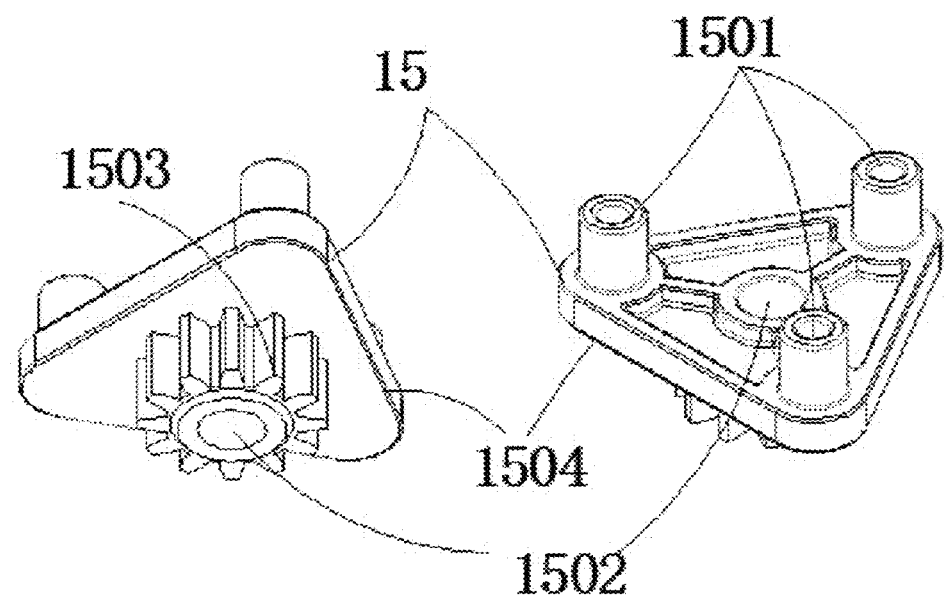
FIG. 8 is a schematic view of a planetary gear disc in the present invention.
Figure 9:
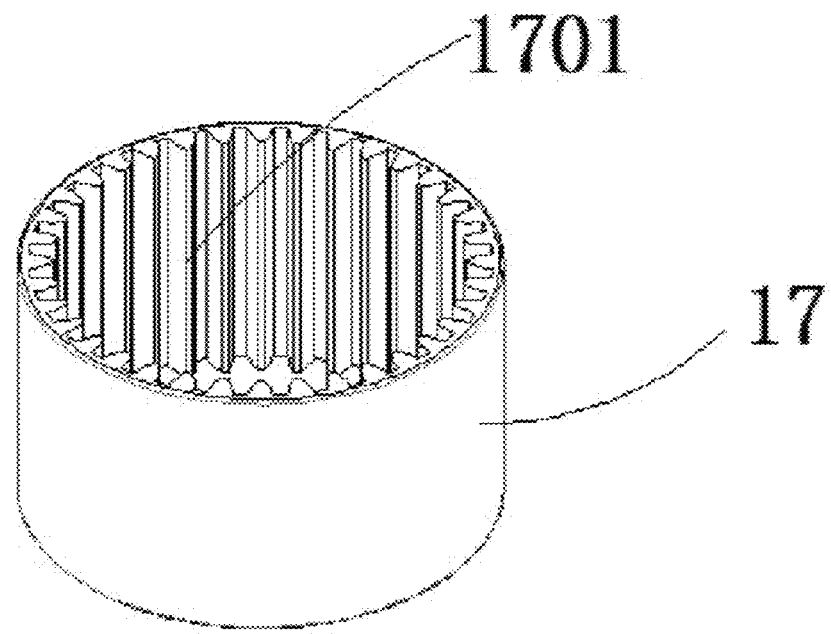
FIG. 9 is a schematic view of a ring gear in the present invention.

The present invention is explained in detail with reference to FIG. 8, center of the planetary gear disc 15 forms a second through hole 1502 fully penetrating and matching the central shaft 14; a gear disc 1504 is formed on the second planetary gears 1503, and the shape thereof is a regular triangle, a square or a circle; the gear disc 1504 has a larger diameter than the second planetary gears 1503, and is smaller than internal hole of the ring gear 17; the second positioning shafts 1501 are disposed on an upper end surface of the gear disc 1504, and the second positioning shafts 1501 are evenly distributed on the gear disc 1504 along a circular track.

Figure 10:
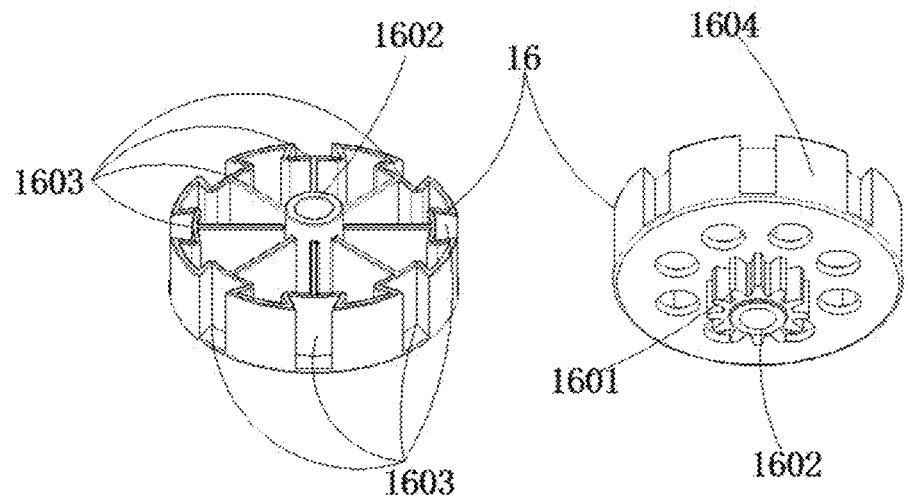
FIG. 10 is a schematic view of an internal drive sprocket in the present invention.
Figure 11:
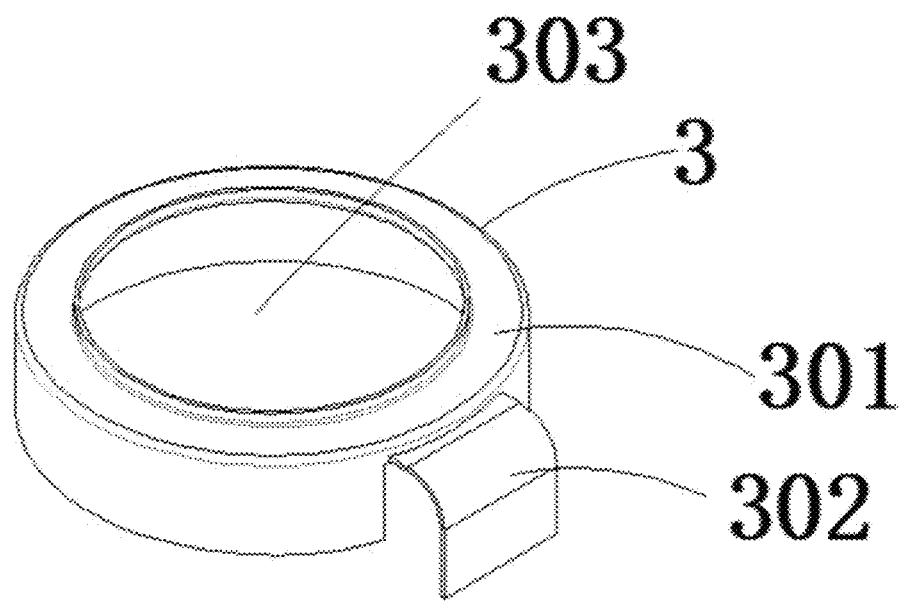
FIG. 11 is a schematic view of a protective cover in the present invention.
Figure 12:
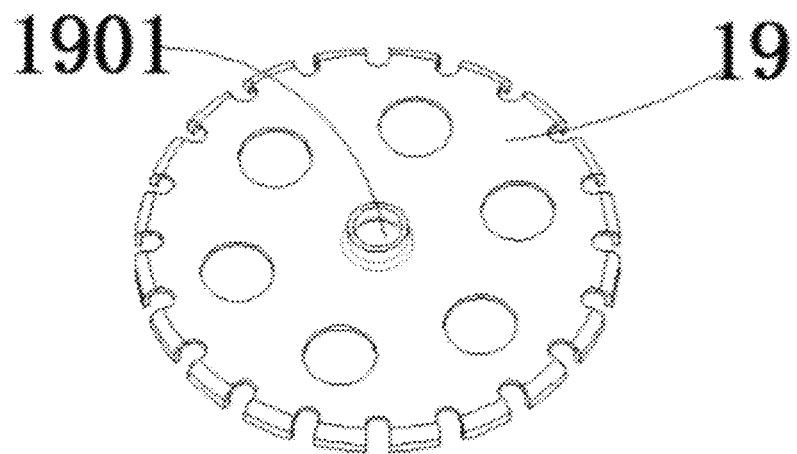
FIG. 12 is a schematic view of a bearing disc in the present invention.
Figure 13:
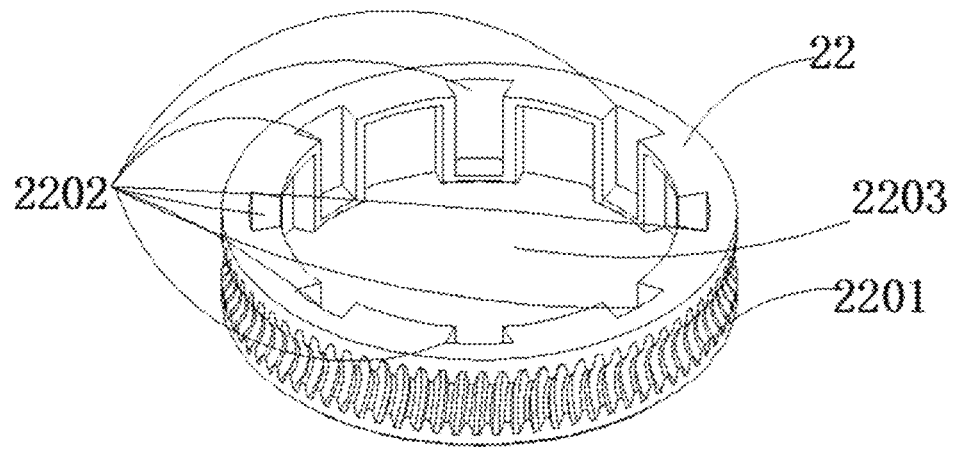
FIG. 13 is a schematic view of an external drive sprocket in the present invention.
Figure 14:
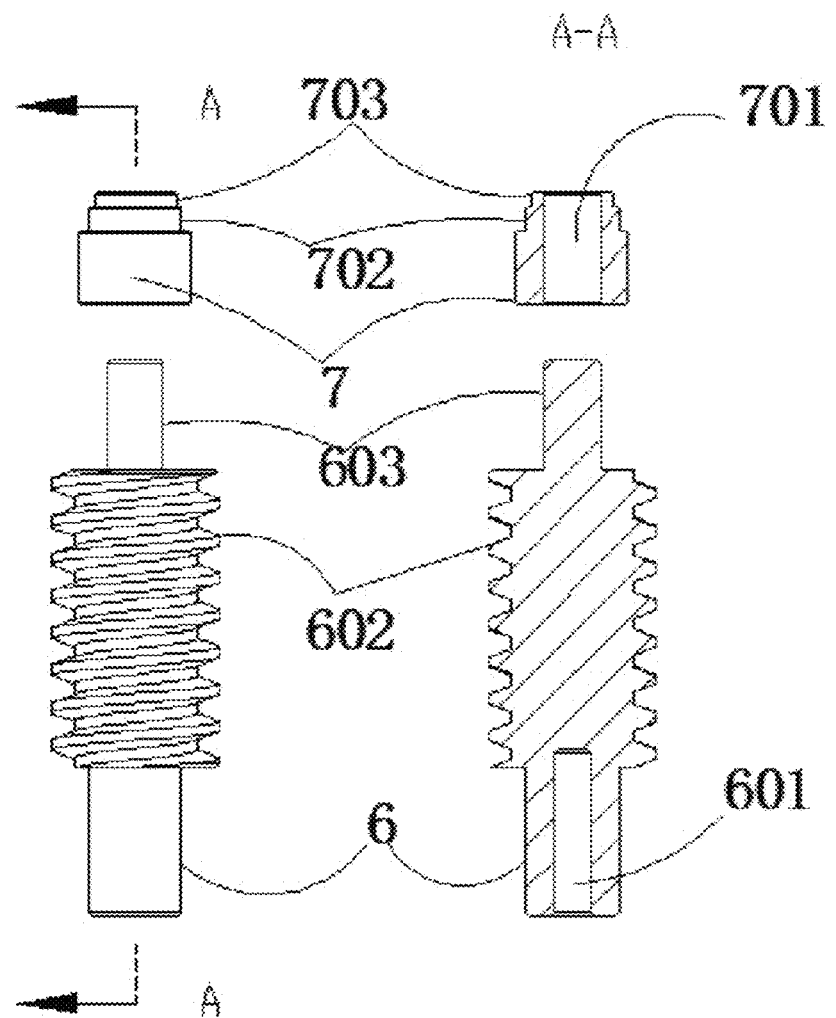
FIG. 14 is a schematic view of a worm shaft and a worm shaft positioning sleeve in the present invention.
Figure 15:
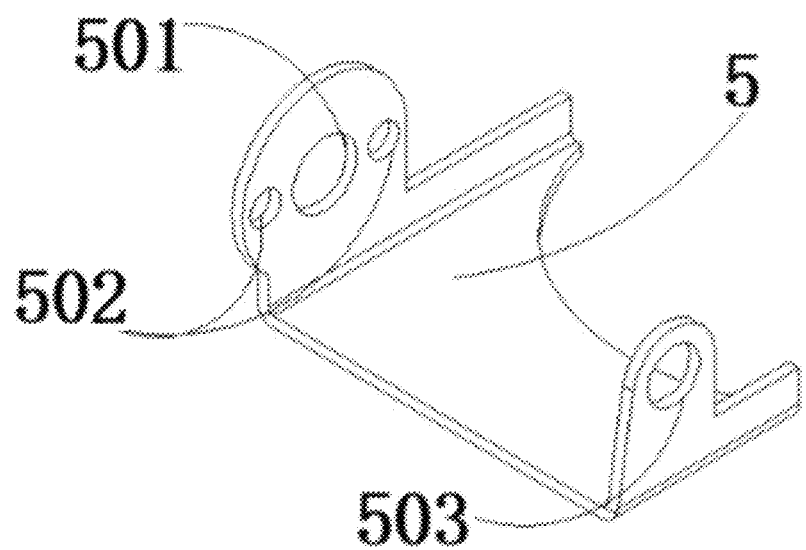
FIG. 15 is a schematic view of a motor bracket in the present invention.

The present invention is explained in details with reference to FIG. 10 and FIG. 12, center of the internal drive sprocket 16 forms a third through hole 1602 fully penetrating and matching the central shaft 14, a second drive sprocket 1604 is formed on an upper end surface of a third planetary gear 1601, and external diameter of the second drive sprocket 1604 is larger than that of the third planetary gear 1601, and is larger than or equal to external diameter of the ring gear 17; the second drive sprocket 1604 is provided with several second clamping slots 1603 matching the second magnetic steel 20, the second clamping slots 1603 are provided to be two or more, evenly distributed along the outer border of the second drive sprocket 1604; a bearing disc 19 is provided on the second drive sprocket 1604, and a through hole 1901 is formed in center of the bearing disc 19 and penetrates up and down and matches the central shaft 14. The external wall of the bearing disc is fixed on the internal wall of the insulation sleeve, or there is a slight gap between the bearing disc and the insulation sleeve, and the gap may be between 0.1 mm and 1.5 mm. And purpose of the bearing disc 18 is to prevent the central shaft 14 from swaying during transmission of the planetary gearbox kit.

The present invention is explained in details with reference to FIG. 1, FIG. 2, FIG. 11 and FIG. 13 to FIG. 15, the motor worm gear and shaft transmission assembly includes a waterproof motor 4, a worm shaft 6 and an external drive sprocket 22.

Wherein, first clamping slots 2202 matching the first magnetic steel 21 are formed inside the external drive sprocket 22, and a worm gear 2201 engaging with the worm shaft 6 is formed outside thereof. Number of the first clamping slots 2202 is equal to that of the second clamping slots 1603, and both are evenly distributed. The external drive sprocket 22 is at the same height as the second drive sprocket 1604, and the external drive sprocket 22 is located outside the insulation sleeve 2.

Wherein, the waterproof motor 4 is fixed on the motor bracket 5 through two screw holes 502 on a motor bracket 5 and corresponding screws 8, the motor bracket 5 is provided with a motor shaft sleeve hole 501 and a worm shaft positioning sleeve hole 503, the motor shaft sleeve hole 501 and the screw holes 8 are on the same side of the motor bracket 5, while the worm shaft positioning sleeve hole is on the other side of the motor bracket 5, one side of the motor bracket 5 and the other side are opposite and parallel to each other; the motor bracket 5 is fixed to the external wall of the insulation sleeve 2, and the motor bracket 5 is located under the lower end surface of the external drive sprocket 22; the worm shaft positioning sleeve hole 503 engages with a circle formed by the second step 703 of the worm shaft positioning sleeve 7; a protective cover 3 is fixed to the upper part of the insulation sleeve 2 by a sleeve opening 303 provided on a worm gear protective cover 301, the external drive sprocket 22 is provided within the worm gear protective cover 301 of the protective cover 3, the lower end surface of the worm gear protective cover 301 may flush with the lower end surface of the external drive sprocket 22, or slightly higher than it, the upper end surface of the external drive sprocket 22 is spaced from the upper internal wall of the worm gear protective cover 301, and the outside of the external drive sprocket 22 is separated from the circular internal wall of the worm gear protective cover 301.

Wherein a thread rod 602 matching the worm gear 2201 is formed outside the worm shaft 6, and a small hole 601 matching the output shaft of the waterproof motor 4 is formed in one end of the worm shaft 6; the other end of the worm shaft 6 is provided with a worm shaft positioning sleeve 7; a through hole 701 is provided inside the worm shaft positioning sleeve 7, and a first step 702 and a second step 703 are formed on the outside thereof.

Wherein a worm shaft opening is provided on a side of the worm gear protective cover 301, and the length of the worm shaft opening corresponds to that of the thread rod 602, the protective cover 3 further includes a worm shaft protective cover 302, which is connected to one side of the worm gear protective cover 302 at the worm shaft opening, and the other side is flat with the upper end surface of the motor bracket 5, the worm shaft protective cover 302 is angular or arc-shaped, and the internal wall of the worm protective cover 302 is not in immediate contact with the thread rod 602.

Figure 2:
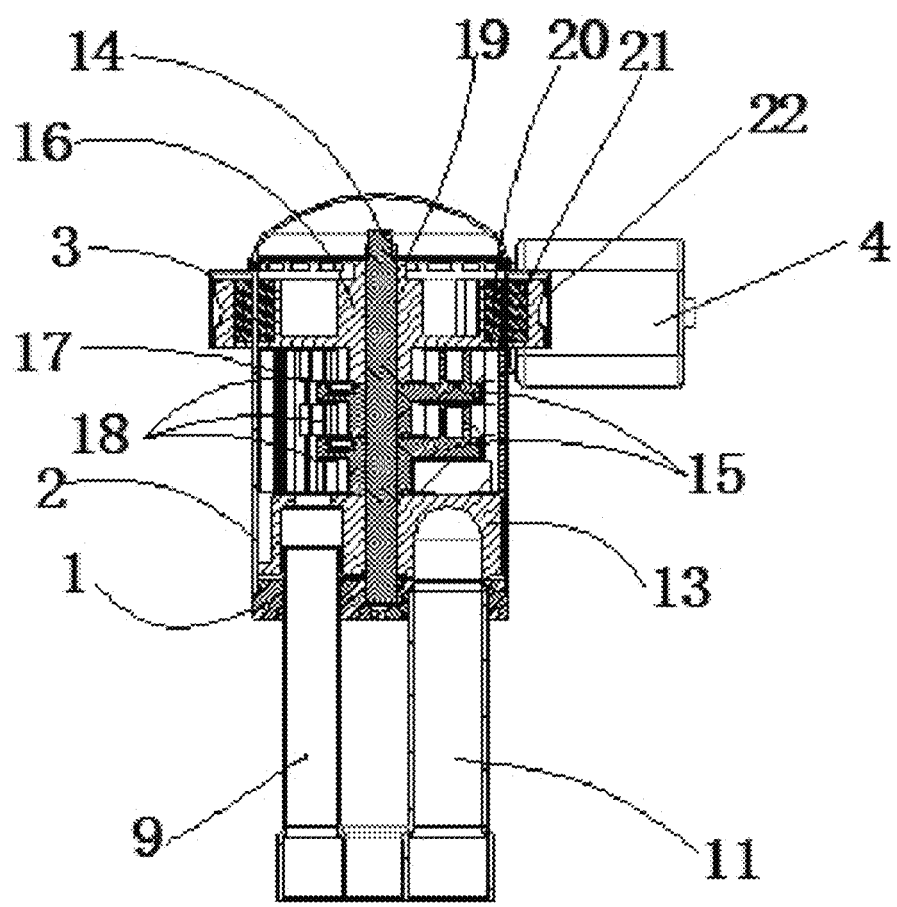
FIG. 2 is a schematic view of internal structure of the present invention.

The present invention is explained in details with reference to FIG. 2, the magnetic N pole surfaces (magnetic S pole surfaces) of the first magnetic steel 21 face the external wall of the insulation sleeve 2, and the magnetic N pole surfaces (magnetic S pole surfaces) of the second magnetic steel 20 face the internal wall of the insulation sleeve 2, alternatively, the magnetic N pole surfaces (magnetic S pole surfaces) of the first magnetic steel 21 face the external wall of the insulation sleeve 2, and the magnetic S pole surfaces (magnetic N pole surfaces) of the second magnetic steel 20 face the internal wall of the insulation sleeve 2.

As shown in FIG. 1, FIG. 2, FIG. 3, and FIG. 4, the working principle of the self-retaining, magnetically-coupled and directly-operated four-way reversing valve is as follows: when the waterproof motor 4 starts (the starting direction can be forward or reverse), the worm shaft 6 also rotates with the waterproof motor 4, and drives the worm gear 2201 on the external drive sprocket 22 rotate; further, a repulsive magnetic field or a attracting magnetic field is generated between the first magnetic steel 21 embedded in the first clamping slot 2202 and the second magnetic steel 20 embedded in the second clamping slot 1603, thereby a repulsive force or gravitational force is produced, which makes the internal drive sprocket 16 rotate in the opposite or the same direction as the external drive sprocket 22 in a magnetically coupled way. When the internal drive sprocket 16 makes a rotational movement, the first planetary gears 18 on the planetary gear disc 15 are driven rotating by the third planetary gear 1601 under the internal drive sprocket 16, and as the ring gear 17 is not movable, the first planetary gears 18 drives the planetary gear disc 15 to perform a circular movement, which is referred to as a first-stage transmission. Similarly, the first planetary gears 18 on another planetary gear disc 15 are driven by the second planetary gears 1503 under the planetary gear disc 15 mentioned above, and as the ring gear 17 is fixed, the first planetary gears 18 drive the downside planetary gear disc 15 to perform a circular motion, which is referred to as a second-stage transmission. Finally, the first planetary gears 18 on the reversing valve disc 13 are driven rotating by the second planetary gears 1503 under the planetary gear disc 15, and as the ring gear 17 is fixed, again the first planetary gears 18 drive the reversing valve disc 13 to perform a circular motion, which is referred to as a third-stage transmission. By the position limit effect resulting from that the D pipe 9 is higher than the upper end surface of the valve seat 1, the D pipe 9 is communicated with the C pipe 10, and the S pipe 11 is communicated with the E pipe 12 (or the D pipe 9 is communicated with the E pipe 12, and S pipe 11 is communicated with C pipe 10). After reversing, it is not necessary to energize for a long time, and the state after reversing can be maintained, which realizes the self-retaining function of the four-way reversing valve.

There are two kinds of working principles of the magnetic coupling method described in the present invention: The working principle of the first kind of magnetic coupling: the magnetic field N pole surface (or magnetic field S pole surface) of the first magnetic steel 21 leans toward the external wall of the insulation sleeve 2, the magnetic field N-pole surface (or the magnetic field S-pole surface) in the second magnetic steel 20 leans toward the internal wall of the insulation sleeve 2, and according to the theory that the same magnetic poles repel and heterogeneous magnetic poles attract each other, the first magnetic steel 21 and the second magnetic steel 20 repel each other. In addition, as there is a slight gap between the magnetic field N pole surface (or magnetic field S pole surface) of the first magnetic steel 21 and the external wall of the insulation sleeve 2, and there is also a slight gap between the magnetic field N pole surface (or magnetic field S pole surface) of the second magnetic steel 20 and the internal wall of the insulation sleeve 2, when the external drive sprocket 22 performs a rotational movement, the friction force generated between the first magnetic steel 21 and the second magnetic steel 20 and the insulation sleeve 2 can be ignored. The surface magnetic field of the first magnetic steel 21 and the second magnetic steel 20 must be at least 500GS, and the rotation speed of the external drive sprocket 22 is determined by rotation speed of the waterproof motor 4. When the waterproof motor 4 transmits rotation torque and rotation speed to the external drive sprocket 22 by the motor worm gear and shaft transmission assembly, rotation direction of the internal drive sprocket 16 is opposite to that of the external drive sprocket 22 due to the magnetic field repulsive force generated between the first magnetic steel 21 and the second magnetic steel 20.

The working principle of the second kind of magnetic coupling: the magnetic field N pole surface (or magnetic field S pole surface) of the first magnetic steel 21 leans toward the external wall of the insulation sleeve 2, the magnetic field S pole surface (or the magnetic field N pole surface) in the second magnetic steel 20 leans toward the internal wall of the isolation sleeve 2, and according to the theory that the same magnetic poles repel and heterogeneous magnetic poles attract each other, the first magnetic steel 21 and the second magnetic steel 20 attract each other. In addition, as there is a slight gap between the magnetic field N pole surface (or magnetic field S pole surface) of the first magnetic steel 21 and the external wall of the insulation sleeve 2, and there is also a slight gap between the magnetic field S pole surface (or magnetic field N pole surface) of the second magnetic steel 20 and the internal wall of the insulation sleeve 2, when the external drive sprocket 22 performs a rotational movement, the friction force generated between the first magnetic steel 21/the second magnetic steel 20 and the insulation sleeve 2 can be ignored. The surface magnetic field of the first magnetic steel 21 and the second magnetic steel 20 must be at least 500GS, and the rotation speed of the external drive sprocket 22 is determined by rotation speed of the waterproof motor 4. When the waterproof motor 4 transmits the rotation torque and the rotation speed to the external drive sprocket 22 through the motor worm gear and shaft transmission assembly, rotation direction of the internal drive sprocket 16 is the same as the rotation direction of the external drive sprocket 22 due to the magnetic field attractive force generated between the first magnetic steel 21 and the second magnetic steel 20.

In the present invention, by cooperation between the first internal slot 1304 of the reversing valve disc 13 and the upper end surface of the valve seat 1, soft sealing is achieved and as a result of pressure that internal air exerts on the second internal slot 1304 of the reversing valve disc 13, the four-way reversing valve with no leakage or only trace leakage is realized.

The embodiment described in the above embodiment 1 serves only for explaining the three-stage transmission principle of the planetary gearbox kit in the self-retaining, magnetically-coupled and directly-operated four-way reversing valve of present invention. Further, embodiment 2 is also described below. The difference between embodiment 2 and embodiment 1 is mainly as follows: The planetary gearbox kit may include one or more than three (including three) planetary gear discs 15, and the one or three or more planetary gear disc(s) 15 is/are arranged between the reversing valve disc 13 and the internal drive sprocket 16. Number of transmission stages of the planetary gearbox kit may be referred to as a two-stage or more than four-stage (including a four-stage).

The above embodiments are only for explaining the technical concept and features of the present invention, and the purpose thereof is that those skilled in the art to understand the content of the present invention and implement it based on the specification, and shall not limit the protection scope of the present invention. And any equivalent changes or modifications made according to the essence of the content of the present invention shall be covered by the protection scope of the present invention.

The invention claimed is:

1. A self-retaining, magnetically-coupled and directly-operated four-way reversing valve, including a valve body, a motor transmission structure, and a reversing valve disc, wherein the valve body includes a valve seat, an insulation sleeve welded onto an upper end surface of the valve seat and a D pipe, an S pipe, a C pipe, and an E pipe, which are connected to a lower end surface of the valve seat;

the motor transmission structure includes a motor worm gear and shaft transmission assembly and a planetary gearbox kit; the motor worm gear and shaft transmission assembly is sleeved onto an upper part of an external wall of the insulation sleeve by a shaft hole of an external drive sprocket, a non-through blind hole is formed in a center of the valve seat, a central shaft is embedded in the blind hole, and the central shaft sequentially connects the reversing valve disc and the planetary gearbox kit;

the reversing valve disc and the planetary gearbox kit are mounted inside the insulation sleeve which is on an upper end of the valve seat.

2. A self-retaining, magnetically-coupled and directly-operated four-way reversing valve according to claim 1, characterized in that, the reversing valve disc is provided with a first internal slot and a second internal slot opposite to the first internal slot; a lower end surface of the first internal slot is in contact with an upper end surface of the valve seat, the second internal slot is spaced apart from the upper end surface of the valve seat, and two through-holes are provided on the second internal slot; a center of the reversing valve disc is provided with a first through-hole matching the central shaft; first positioning shafts matching first planetary gears are formed above both the first internal slot and the second internal slot, the first positioning shafts are provided to be two to six, and the first positioning shafts are distributed on a circular track.

3. A self-retaining, magnetically-coupled and directly-operated four-way reversing valve according to claim 1, characterized in that, the valve seat is provided with a D hole, an S hole, a C hole, and an E hole; and the D hole is opposite to the S hole, the C hole is opposite to the E hole;

the D hole is a through-hole, while the S hole, the C hole, and the E hole are step holes; and an upper end surface of the D pipe is higher than an upper end surface of the valve seat and is located in a second internal slot;

a step corresponding to the insulation sleeve is formed outside the valve seat.

4. A self-retaining, magnetically-coupled and directly-operated four-way reversing valve according to claim 1, characterized in that, the planetary gearbox kit includes first positioning shafts, first planetary gears, planetary gear discs, an internal drive sprocket, a ring gear, a central shaft and a bearing disc on the reversing valve disc; the central shaft sequentially connects the reversing valve disc, the planetary gear discs, the internal drive sprocket, and the bearing disc from bottom up together;

the first planetary gears are respectively mounted on each of the first positioning shafts on the reversing valve disc and second positioning shafts on the planetary gear discs, and quantity of the second positioning shafts is equal to quantity of the first positioning shafts;

second planetary gears under each of the planetary gear discs is engaged and flush with each of the first planetary gears respectively provided on each of the first positioning shafts immediately under each of the planetary gear discs;

the internal drive sprocket is provided with a third planetary gear, which is engaged and flush with the first planetary gears provided respectively on the second positioning shafts;

the planetary gear discs and the first planetary gears are embedded in the ring gear;

the ring gear is fixed to an internal wall of the insulation sleeve between the reversing valve disc and the internal drive sprocket; internal teeth of the ring gear are engaged with external teeth of the first planetary gears mounted on the first positioning shafts and the second positioning shafts.

5. A self-retaining, magnetically-coupled and directly-operated four-way reversing valve according to claim 4, characterized in that,
a second through-hole penetrating up and down and matching the central shaft is formed in a center of each of the planetary gear discs; a gear disc is formed on each of the second planetary gears, with shape of the gear disc a regular triangle, or a square or a circle; the gear disc has a larger diameter than the second planetary gears, and is smaller than diameter of an internal hole of the ring gear; the second positioning shafts are disposed on an upper end surface of each of the gear discs, and the second positioning shafts are evenly distributed on the gear discs along a circular track;
the planetary gearbox kit comprises one or more planetary gear discs, located between the reversing valve disc and the internal drive sprocket.

6. A self-retaining, magnetically-coupled and directly-operated four-way reversing valve according to claim 4, characterized in that,
a third through-hole fully penetrating and matching the central shaft is formed in a center of the internal drive sprocket, a second drive sprocket is formed on an upper end surface of the third planetary gear, and external diameter of the second drive sprocket is larger than external diameter of the third planetary gear, and is larger than or equal to external diameter of the ring gear;
the second drive sprocket is provided with several second clamping slots matching second magnetic steel, the second clamping slots are provided to be two or more, evenly distributed along an outer border of the second drive sprocket;
the bearing disc is provided on the second drive sprocket, and a through-hole is formed in a center of the bearing disc, penetrating fully and matching the central shaft; an external border of the bearing disc is fixed on the internal wall of the insulation sleeve, or there is a slight gap between the bearing disc and the insulation sleeve, and the gap is between 0.2 mm and 1.5 mm.

7. A self-retaining, magnetically-coupled and directly-operated four-way reversing valve according to claim 6, characterized in that,
magnetic N pole surfaces (magnetic S pole surfaces) of a first magnetic steel face of an external wall of the insulation sleeve, and magnetic N pole surfaces (magnetic S pole surfaces) of the second magnetic steel face an internal wall of the insulation sleeve, alternatively, the magnetic N pole surfaces (magnetic S pole surfaces) of the first magnetic steel face the external wall of the insulation sleeve, and the magnetic S pole surfaces (magnetic N pole surfaces) of the second magnetic steel face the internal wall of the insulation sleeve.

8. A self-retaining, magnetically-coupled and directly-operated four-way reversing valve according to claim 4, characterized in that,
each of the first planetary gears is provided with a through-hole matching each of the first positioning shafts and each of the second positioning shafts, and external teeth of the first planetary gears engage with the ring gear, the second planetary gears and the third planetary gear.

9. A self-retaining, magnetically-coupled and directly-operated four-way reversing valve according to claim 1, characterized in that,
the motor worm gear and shaft transmission assembly includes a waterproof motor, a worm shaft and an external drive sprocket;
the external drive sprocket comprises first clamping slots matching first magnetic steel provided inside the external drive sprocket, and a worm gear matching the worm shaft located outside;
number of the first clamping slots is equal to number of the second clamping slots, and both the first clamping slots and the second clamping slots are uniformly distributed; the external drive sprocket is at a height equal to the second drive sprocket, and is located outside the insulation sleeve while the internal drive sprocket inside the insulation sleeve;
the waterproof motor is fixed on a motor bracket by two screw holes provided on the motor bracket and corresponding screws; the motor bracket is provided with a motor shaft sleeve hole and a worm shaft positioning sleeve hole, the motor shaft sleeve hole and the screw holes are on one side of the motor bracket, while the worm shaft positioning sleeve hole on the other side of the motor bracket, one side of the motor bracket and the other side of the motor bracket are opposite and parallel to each other;
the motor bracket is fixed to an external wall of the insulation sleeve, and located under a lower end surface of the external drive sprocket; the worm shaft positioning sleeve hole engages with a circle formed by a second step of a worm shaft positioning sleeve;
a protective cover is fixed to an upper part of the insulation sleeve by a sleeve opening provided on a worm gear protective cover, the external drive sprocket is provided under the worm gear protective cover of the protective cover, a lower end surface of the worm gear protective cover flushes with a lower end surface of the external drive sprocket, or is slightly higher than the lower end surface of the external drive sprocket, an upper end surface of the external drive sprocket is spaced from an upper internal wall of the worm gear protective cover, and outside of the external drive sprocket is separated from a circular internal wall of the worm gear protective cover.

10. A self-retaining, magnetically-coupled and directly-operated four-way reversing valve according to claim 9, characterized in that,
a thread rod matching the worm gear is formed outside the worm shaft, and a small hole matching an output shaft of the waterproof motor is formed in one end of the worm shaft; the other end of the worm shaft is provided with the worm shaft positioning sleeve; a through-hole is provided inside the worm shaft positioning sleeve, and a first step and a second step are formed on an outer side of the worm shaft positioning sleeve;
a worm shaft opening is provided on a side of the worm gear protective cover, and length of the worm shaft opening corresponds to length of the thread rod, the worm gear protective cover further includes a worm shaft protective cover, which is connected to one side of the worm gear protective cover at the worm shaft opening, and another side of the worm shaft protective cover is flat with an upper end surface of the motor bracket, the worm shaft protective cover is angular or arc-shaped, and an internal wall of the worm protective cover is not in immediate contact with the thread rod.

11. A self-retaining, magnetically-coupled and directly-operated four-way reversing valve according to claim 9, characterized in that, magnetic N pole surfaces (magnetic S pole surfaces) of the first magnetic steel face the external wall of the insulation sleeve, and magnetic N pole surfaces (magnetic S pole surfaces) of a second magnetic steel face the internal wall of the insulation sleeve, alternatively, the magnetic N pole surfaces (magnetic S pole surfaces) of the first magnetic steel face the external wall of the insulation sleeve, and the magnetic S pole surfaces (magnetic N pole surfaces) of the second magnetic steel face the internal wall of the insulation sleeve.

\* \* \* \* \*